under 35 U.S.C. 154(b) by 79 days.

(12) United States Patent
Sugiyama (10) Patent No.: US 11,892,716 B2
(45) Date of Patent: Feb. 6, 2024

(54) OPTICAL DEVICE AND OPTICAL TRANSCEIVER USING THE SAME

(71) Applicant: Fujitsu Optical Components Limited, Kawasaki (JP)

(72) Inventor: Masaki Sugiyama, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 79 days.

(21) Appl. No.: 17/568,261

(22) Filed: Jan. 4, 2022

(65) Prior Publication Data

US 2022/0260866 A1    Aug. 18, 2022

(30) Foreign Application Priority Data

Feb. 12, 2021   (JP) ................ 2021-020434

(51) Int. Cl.
*G02F 1/035* (2006.01)
*G02B 6/12* (2006.01)
*G02B 6/13* (2006.01)

(52) U.S. Cl.
CPC ............ *G02F 1/035* (2013.01); *G02B 6/13* (2013.01); *G02B 2006/1204* (2013.01)

(58) Field of Classification Search
CPC .... G02F 1/035; G02B 6/13; G02B 2006/1204
See application file for complete search history.

(56) References Cited

U.S. PATENT DOCUMENTS

| 5,949,944 | A | 9/1999 | Minford et al. |
| 2003/0063362 | A1* | 4/2003 | Demir ................ G02F 1/01708 359/240 |
| 2009/0324156 | A1 | 12/2009 | Kinpara et al. |
| 2021/0286203 | A1* | 9/2021 | Safian ............... G02F 1/0356 |
| 2022/0026634 | A1* | 1/2022 | Bahadori ........... G02F 1/0018 |

FOREIGN PATENT DOCUMENTS

JP    5-66428    3/1993
JP    2008-89936    4/2008

* cited by examiner

*Primary Examiner* — Tina M Wong
(74) *Attorney, Agent, or Firm* — STAAS & HALSEY LLP (57) ABSTRACT

An optical device includes a substrate, a layered structure provided on the substrate and including an intermediate layer, an optical waveguide formed of a thin crystal film having an electro-optic effect, and a buffer layer stacked in this order, and an electrode provided on or above the buffer layer and configured to apply a direct current voltage to the optical waveguide. The resistivity of the intermediate layer is higher than the resistivity of the buffer layer.

15 Claims, 9 Drawing Sheets

Rsb1 relatively increasing along decrease of Rsb2

Rsb maintained low, while Rsh maintained high

OPTICAL DEVICE AND OPTICAL TRANSCEIVER USING THE SAME

CROSS-REFERENCE TO RELATED APPLICATIONS

This application is based upon and claims priority to earlier Japanese Patent Application No. 2021-020434 filed Feb. 12, 2021, which is incorporated herein by reference in its entirety.

FIELD

The present documents relate to an optical device and an optical transceiver using the same.

BACKGROUND

In a transmitter front-end circuit for optical data transmission, an electro-optic modulator, also called an optical modulator, is used to modulate the intensity of light according to data signals. An optical modulator configured to modulate a light beam making use of an electro-optic effect is fabricated on a crystalline lithium niobate (LN) or the like, having an electro-optic effect. To fabricate the electro-optic modulator, optical waveguides are formed in the substrate by diffusing a metal, such as titanium (Ti), from the surface of the substrate, and coplanar electrodes are provided over the optical waveguides via a buffer layer therebetween. See, for example, Patent Document 1 presented below.

The difference in refractive index between the Ti-diffused waveguides and the LN substrate is small, and the light confinement effect is weak. With a typical LN modulator, the electric-field application efficiency is insufficient, and the drive voltage tends to increase. Light confinement is improved by forming the waveguides with a thin film of LN crystal, in place of the conventional Ti-diffused waveguides.

In forming an optical waveguide with a thin film of LN crystal, clad or buffer layers having refractive indexes lower than that of the LN crystal are provided to the top and the bottom of the thin LN crystal film in order to confine a light beam within the LN waveguide. When a DC bias voltage is applied via the buffer layer, the electric field applied to the optical waveguide may be weakened due to voltage drop at the buffer layer. In this case, DC bias drift will shift in the positive direction (namely, the direction requiring the bias voltage to be increased). DC bias drift is a phenomenon in which the operating point or the optical output power of the optical modulator changes over time because the interference condition changes due to continuous voltage application. If the change in the DC bias drift toward the positive direction exceeds a certain degree, electro-optic modulation cannot be correctly performed any longer even if a DC bias is applied. The working lifetime of the optical devices is shortened, and long-term reliability is impaired. An optical device having long-term operational reliability under application of a bias voltage is desired.

Prior art document(s) described above is (are):
Patent Document 1: JP Patent Application Laid-open Publication No. 2008-89936

SUMMARY

In an embodiment, an optical device includes a substrate; a layered structure provided on the substrate, the layered structure including an intermediate layer, an optical waveguide formed of a thin crystal film having an electro-optic effect, and a buffer layer stacked in this order; and an electrode provided on or above the buffer layer and configured to apply a direct current voltage to the optical waveguide. The resistivity of the intermediate layer is higher than the resistivity of the buffer layer.

The object and advantages of the invention will be realized and attained by means of the elements and combinations particularly pointed out in the claims. It is to be understood that both the foregoing general description and the following detailed description are exemplary and explanatory and are not restrictive to the invention as claimed.

EMBODIMENT(S)

Prior to describing the configuration of an optical modulator according to an embodiment, more detailed explanation is made with respect to a technical problem as to the change in DC bias drift occurring in an optical modulator formed of thin film LN waveguides.

Figure 1A:
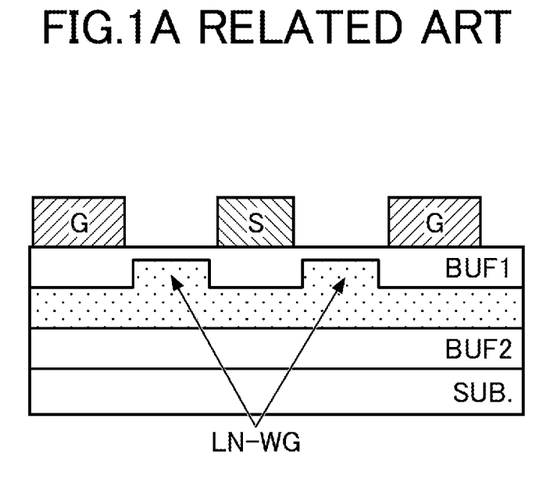
FIG. 1A is a schematic cross-sectional view of a typical optical modulator formed of a thin film LN waveguide.
Figure 1B:
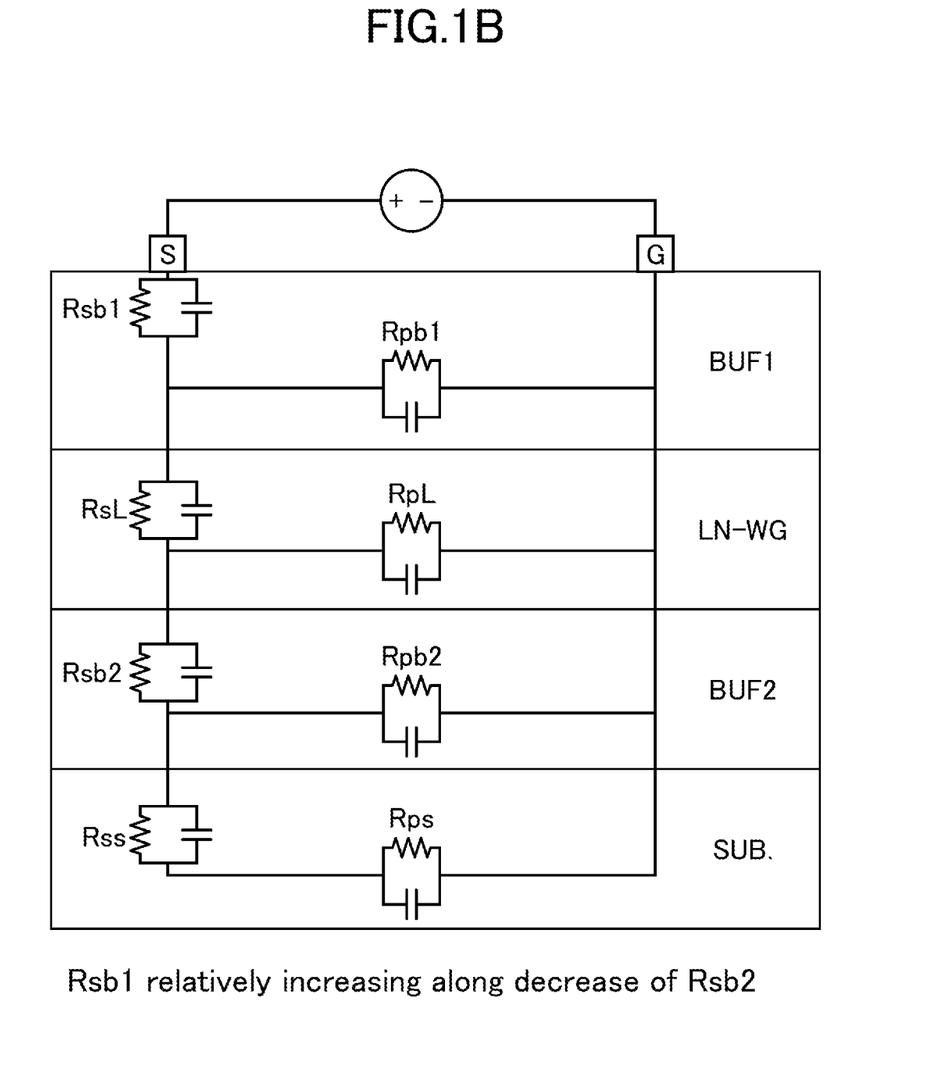
FIG. 1B is an equivalent circuit diagram of the optical modulator illustrated in FIG. 1A.

FIG. 1A is a schematic cross-sectional view of a typical optical modulator formed of optical waveguides of thin film LN crystal (labelled as "LN-WG" in the figure). FIG. 1B illustrates an equivalent circuit of the optical modulator of FIG. 1A. The optical waveguides LN-WGs are formed on a support substrate (labelled as "SUB." in the figure), and sandwiched between a first buffer layer BUF1 and a second buffer layer UBF2 from the top and the bottom. A signal electrode S and ground electrodes G are provided on the first buffer layer BUF1, such that a coplanar type electrode structure is formed.

In general, the first buffer layer BUF1 and the second buffer layer BUF2 are formed of the same material because of the simplicity of the manufacturing process. Accordingly, the volume resistivities of the first buffer layer BUF1 and the second buffer layer BUF2 are the same.

With reference to FIG. 1B illustrating the equivalent circuit, series resistance Rss, Rsb2, RsL, and Rsb1 are produced in the layered structure of the substrate SUB, the second buffer layer BUF2, the optical waveguide LN-WG, and the first buffer layer BUF1 stacked in this order from the bottom. In addition, parallel resistances Rps, Rpb2, RpL and Rpb1 are produced. The resistances of the optical waveguide LN-WG and the second buffer layer BUF2 are connected to the series resistance Rsb1 of the first buffer layer BUF1.

When a voltage is applied between the signal electrode S and the ground electrode G, the electrical resistances of the optical waveguide LN-WG and the second buffer layer BUF2 become smaller due to the voltage drop in the first buffer layer BUF1. As a result, the series resistance Rsb1 of the first buffer layer BUF1 relatively increases, and the influence of the voltage drop becomes conspicuous. The electric field applied to the optical waveguide LN-WG is weakened, and the DC bias drift shifts to the positive direction, which requires the DC bias voltage to be increased in order to maintain the operating point appropriately.

To overcome the adverse influence of the voltage drop in the first buffer layer BUF 1, the embodiment provides an improved structure. In the embodiment, an optical waveguide formed of a thin film LN crystal is sandwiched between a buffer layer and an intermediate layer, both having lower refractive indexes than the optical waveguide. The resistivity of the intermediate layer is greater than the resistivity of the buffer layer, thereby suppressing the voltage drop in the buffer layer. In the description below, the term "resistivity" means volume resistivity unless otherwise specified.

Figure 2:
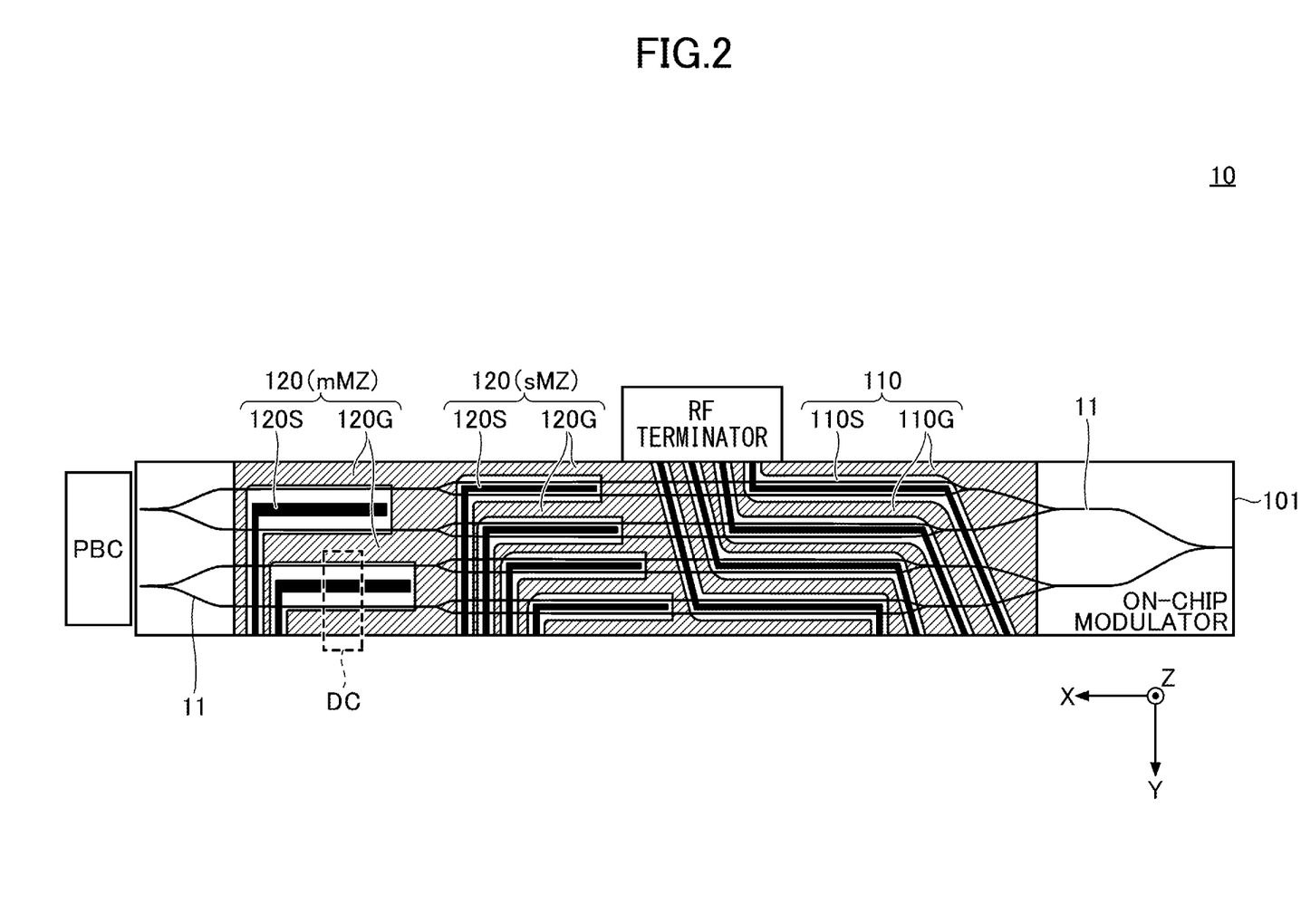
FIG. 2 is a schematic plan view of an optical modulator according to an embodiment.

FIG. 2 is a schematic plan view of an optical modulator 10 according to an embodiment, which is an example of an optical device. The configuration of the embodiment described below is also applicable to other optical devices such as optical switches, optical filters, etc., or to photonic integrated circuits in which the optical devices are integrated together with laser diodes, photodiodes, or the like.

The optical modulator 10 is a Mach-Zehnder (MZ) optical modulator formed by optical waveguides 11 on a substrate 101. For convenience, the light propagation direction is indicated as the X direction, the height direction of the optical modulator 10 is the Z direction, and the direction orthogonal to the X and Z directions is the Y direction.

The optical waveguide 11 is formed of a ridge-type thin-film crystal waveguide, as will be described later. At one end (on the −X side, for example) of the optical modulator 10, the optical waveguide 11 is split into two, and an IQ modulator for X polarization and an IQ modulator for Y polarization are formed in parallel. At the other end (on the +X side, for example) of the optical modulator 10, the outputs of the two IQ modulators are combined by a polarization beam combiner (PBC). In this example, the optical modulator 10 is a 4-channel modulator based on polarization multiplexing IQ modulation.

The IQ modulator has an I channel and a Q channel for each of the X polarization and the Y polarization. The entirety of the IQ modulator is referred to as a parent MZ or a master MZ (mMZ). The MZ interferometer that forms each of the I-channel and the Q-channel of the IQ modulator is named a child MZ or a sub-MZ (sMZ).

The optical modulator 10 is provided with RF electrodes 110 and DC electrodes 120. The RF electrodes 110 and the DC electrodes 120 have, for example, a coplanar structure.

The RF electrodes 110 include an RF signal electrode 110S and an RF ground electrode 110G. The RF signal electrode 110S and the RF ground electrode 110G are formed in the same layer above the optical waveguide 11 when viewed in the stacking direction. The RF signal electrode 110S is used to input an RF signal to the optical waveguide 11 of each of the child MZs which form the I channel and the Q channel, respectively.

A high-rate electric signal having a band of several tens of GHz is input to the RF signal electrode 110S to perform high-speed electro-optic modulation. Upon application of a signal voltage to the RF signal electrode 110S, the refractive index of the optical waveguide 11 changes due to the electric field produced in the optical waveguide 11, and the phase of light travelling through the optical waveguide 11 varies. The light output level changes depending on the difference in the optical phase between the waveguides constituting the I channel and the Q channel.

The DC electrode 120 includes a DC signal electrode 120S and a DC ground electrode 120G. The DC signal electrode 120S and the DC ground electrode 120G are formed in the same layer above the optical waveguide 11 when viewed in the stacking direction. A DC bias is applied to the DC signal electrode 120S in order to adjust the phase of the MZ interferometer. The DC signal electrode 120S includes a DC signal electrode 120S (mMZ) provided to the optical waveguide 11 of the parent MZ to apply a DC bias voltage to the parent MZ interferometer, and a DC signal electrode 120S (sMZ) provided to the optical waveguide 11 of the child MZ to apply a DC bias voltage to the child MZ interferometer.

The DC bias voltage applied to the DC signal electrode 120S of the child MZ (sMZ) is for maintaining the operating point of the I channel and the Q channel at a desired point (for example, a point at which the optical output power becomes ½ of the peak power). The DC bias voltage is controlled such that ON and OFF of the electric signal corresponds to ON and OFF of the optical signal.

The I channel and the Q channel for X polarization are combined to produce an IQ signal, and the I channel and the Q channel for Y polarization are combined to produce another IQ signal. Either one of the IQ signals is subjected to rotation of the polarization plane, and then combined with the other IQ signal at the PBC, whereby a polarization multiplexed optical signal is produced.

Figure 3:
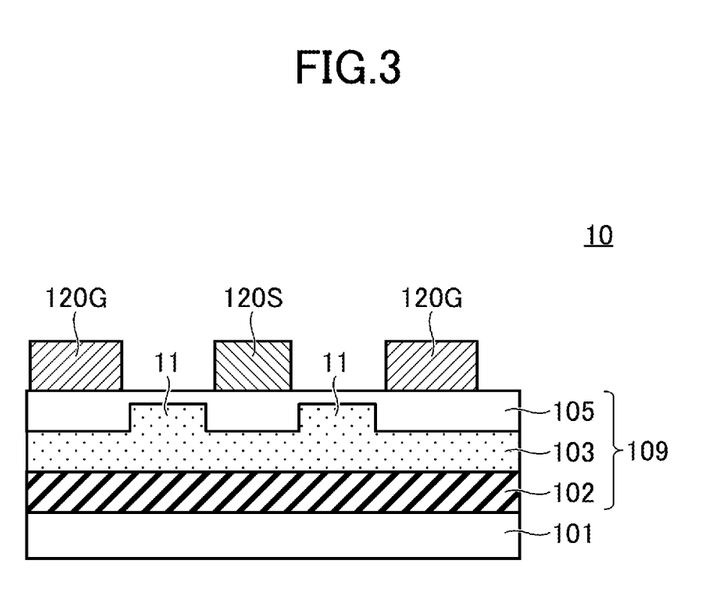
FIG. 3 is a schematic cross-sectional view of the optical modulator of the embodiment.
Figure 4:
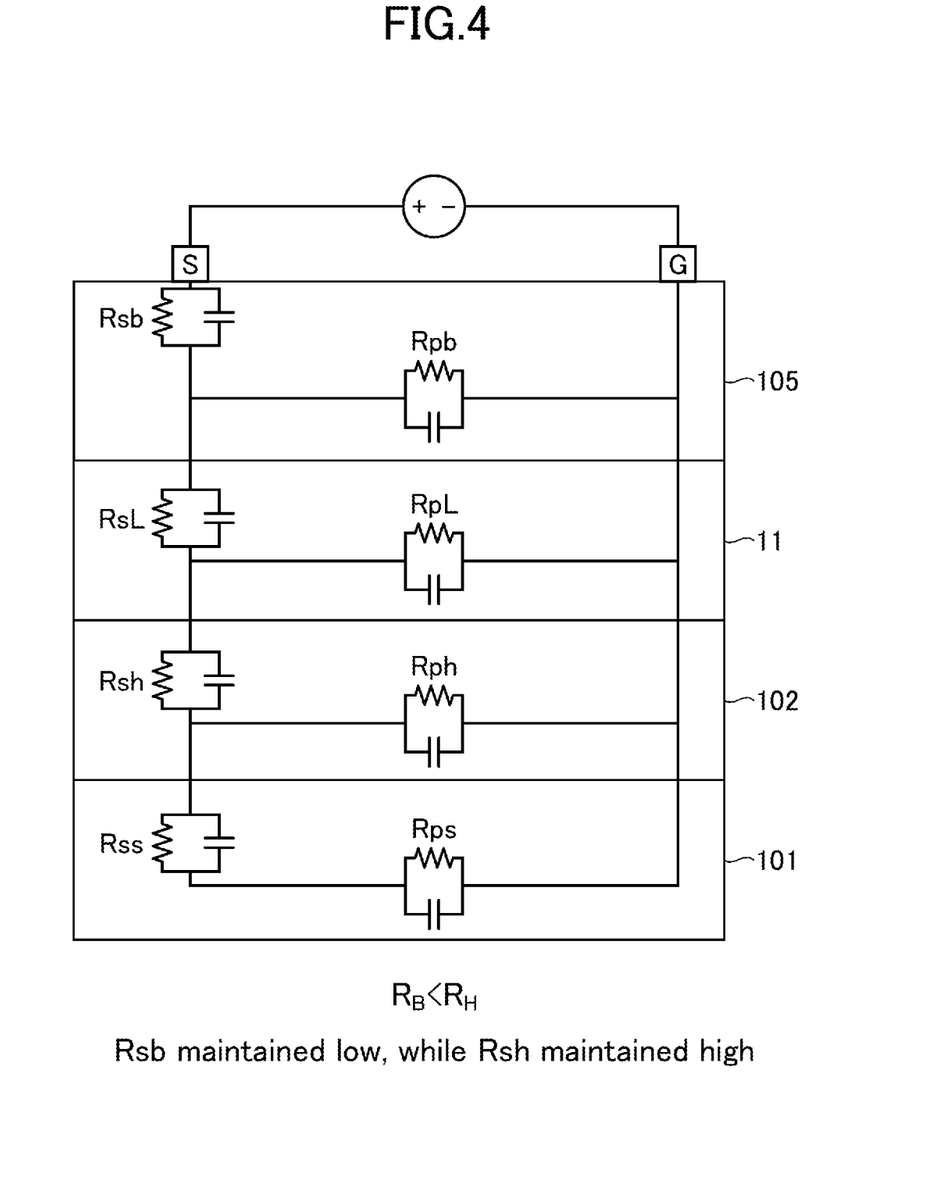
FIG. 4 is an equivalent circuit diagram of the optical modulator illustrated in FIG. 3.

FIG. 3 is a schematic cross-sectional view taken in a region in which the DC electrodes 120 are provided to the optical modulator 10 of FIG. 2, and FIG. 4 is an equivalent circuit diagram of the configuration of FIG. 3. The optical modulator 10 has a multilayer structure 109 on a substrate 101, in which an intermediate layer 102, optical waveguides 11 formed of a thin crystal film 103 having an electro-optic effect, and a buffer layer 105 are provided in this order. A DC signal electrode 120S and DC ground electrodes 120G are provided with a coplanar configuration on the buffer layer 105.

The substrate 101 is a support base to support the optical modulator 10. The type of the substrate is not particularly limited, and any substrate appropriate for supporting the optical modulator, such as an LN substrate, a LiTaO$_3$ substrate, an Al$_2$O$_3$ substrate, a silicon (Si) substrate, a quartz substrate, or the like, may be used. The intermediate layer 102 and the buffer layer 105, which sandwich the ridge-shaped optical waveguides 11 formed of the thin crystal film 103 in the stacking direction, may serve as clad layers to confine the light within the optical waveguides 11.

The intermediate layer 102 is made of a material whose resistivity is higher than that of the buffer layer 105 in order to effectively concentrate the electric field applied from the DC electrode 120 into the optical waveguide 11. The intermediate layer 102 may be formed of $SiO_2$, or a mixed crystal of $SiO_2$ and other oxide such as $TiO_2$, $ZrO_2$, etc.

The optical waveguides 11 formed by the thin crystal film 103 are made of a crystal having a high electro-optic effect, such as LN, $LiTaO_3$, or a mixed crystal of $LiNbO_3$ and $LiTaO_3$. The height of the ridge portions of the optical waveguides 11 is, for example, several hundred nanometers (nm) to 500 nm.

The buffer layer 105 which covers the optical waveguides 11 and the thin crystal film 103 is made of a material having as great a difference in refractive index as possible from the optical waveguide 11, and having a resistivity lower than that of the intermediate layer 102. The buffer layer 105 may be formed of a material in which a dopant is added to the $SiO_2$ base material. By setting the resistivity of the buffer layer 105 lower than that of the intermediate layer 102, the voltage drop in the buffer layer 105 can be reduced, and DC drift in the positive direction is suppressed.

The composition of the buffer layer 105 may be selected such that the resistivity of the buffer layer 105 is lower than that of the thin crystal film 103 configuring the optical waveguides 11. In this case, the resistivities of the optical waveguide 11 and the intermediate layer 102 are higher than the resistivity of the buffer layer 105, and the influence of the voltage drop in the buffer layer 105 is further suppressed.

Referring to the equivalent circuit of FIG. 4, a series resistance Rsb of the buffer layer 105, a series resistance RsL of the optical waveguide 11 of the LN thin film, a series resistance Rsh of the intermediate layer 102, and a series resistance Rss of the substrate 101 are formed in the multilayer structure in this order from the DC signal electrode S. Further, a parallel resistance Rpb of the buffer layer 105, a parallel resistance RpL of the optical waveguide 11 of the LN thin film, a parallel resistance Rph of the intermediate layer 102, and a parallel resistance Rps of the substrate 101 are produced between the DC signal electrode S and the DC ground electrode G.

Immediately after application of a DC bias, the amount of negative charges accumulated between the DC signal electrode S and the optical waveguide 11, and the amount of positive charges accumulated between the DC ground electrode G and the optical waveguide 11 are small, and the capacitance is dominant in each of the layers. After sufficient time has passed, the voltage applied to the optical waveguide 11 is regulated by the relationship between the resistance values of the respective layers. In particular, the voltage drop in the series resistance Rsb of the buffer layer 105 affects the resistances of the optical waveguide 11 and the intermediate layer 102 connected in series with the Rsb, and becomes a dominant factor inducing the DC drift. As to the parallel resistance Rp, there is almost no influence on the DC drift because the same voltage V is applied to the respective layers.

By lowering the resistance of the buffer layer 105 and suppressing the voltage drop in the buffer layer 105, the electric field can be concentrated into the optical waveguide 11, and shifting of the DC drift in the positive direction can be suppressed. If the intermediate layer 102 and the buffer layer 105 are made of the same material with the same composition, the resistances of the optical waveguide 11 and the intermediate layer 102 connected to the series resistance Rsb of the buffer layer 105 will decrease, as has been described above with reference to FIG. 1B, and the electric field applied to the optical waveguide 11 is reduced.

In contrast, in the embodiment, the resistivity of the intermediate layer 102 is set greater than the resistivity of the buffer layer 105. By increasing the resistivity of the intermediate layer 102, the series resistance Rsh of the intermediate layer 102 connected in series with Rsb of the buffer layer 105 can be increased relative to the series resistance Rsb. The DC drift initially depends on the capacitance, but in the long run, the DC drift is regulated by the resistance. Keeping the series resistance Rsh of the intermediate layer 102 relatively high so as to suppress the voltage drop in the buffer layer 105 is an effective counter measure for preventing the DC drift from shifting in the positive direction. Hence, the device lifetime is increased and long-term reliability can be achieved.

In addition to the resistance relationship between the intermediate layer 102 and the buffer layer 105, the resistivity of the optical waveguide 11 may be set greater than the resistivity of the buffer layer 105. By setting the resistivity of the optical waveguide 11 greater than the resistivity of the buffer layer 105, the total of the resistances of the optical waveguide 11 and the intermediate layer 102 connected to the series resistance Rsb of the buffer layer 105 can be further increased. As a result, the electric field is concentrated into the optical waveguide 11 more efficiently, and adverse influence of voltage drop in the buffer layer 105 can be suppressed.

The resistivity of a thin crystal film having an electro-optic effect is dominantly determined by the material. Accordingly, the resistance of the buffer layer 105 or the intermediate layer 102 can be efficiently controlled by adjusting a dopant to be added and/or film forming conditions. To decrease the resistance of the buffer layer 105, impurity ions such as beryllium (Be) or aluminum (Al) may be added at a predetermined concentration to an $SiO_2$ base material. The resistance of the intermediate layer 102 can be increased by increasing the film density or the amount of oxygen introduced during the film formation, under the control on the film forming process such as chemical vapor deposition (CVD) or sputtering.

If the resistivity of the intermediate layer 102 is lower than the resistivity of the optical waveguide 11, or if the intermediate layer 102 is thin, then the influence of the series resistance Rss of the substrate 101 cannot be ignored. In this case, it is desired to increase the thickness of the intermediate layer 102 so as to be thicker than the thin crystal film 103 and the optical waveguides 11, in order to increase the series resistance Rsh of the intermediate layer 102. Alternatively, the resistivity of the substrate 101 may be set greater than the resistivity of the buffer layer 105 to reduce the influence of the voltage drop in the buffer layer 105. Examples of a high resistance substrate include, but are not limited to, $Al_2O_3$ substrates and $LiTaO_3$ substrates.

Figure 5:
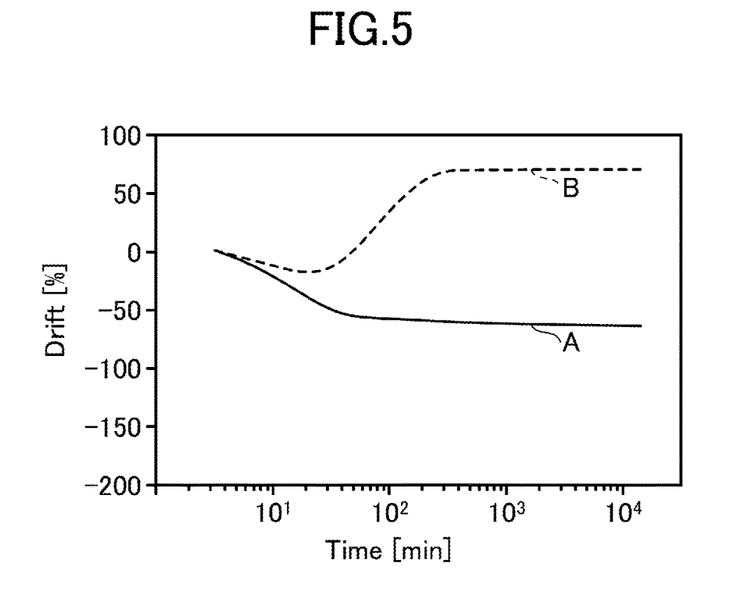
FIG. 5 illustrates the drift characteristic of the optical modulator of the embodiment, compared with the drift characteristic of the optical modulator of FIG. 1A.

FIG. 5 illustrates a drift characteristic of the optical modulator 10 of the embodiment, in comparison with the drift characteristic of the optical modulator illustrated in FIG. 1A. The solid line A represents drift of the optical modulator 10 of the embodiment, and the broken line B represents drift of the optical modulator of FIG. 1A. The horizontal axis denotes time (minutes), and the vertical axis denotes the amount of drift expressed as a percentage of a DC drift ($\Delta V$) with respect to the applied voltage ($\pm V$ volts). Drift 0% represents the state in which $V\pi$ driving for causing the output power to change from zero to the peak is achieved at a given DC bias voltage.

As illustrated by the broken line B, with the configuration of FIG. 1A, the DC drift initially shifts in the negative direction gradually, and then switches to a rapid change in the positive direction. After 200 minutes, the DC drift exceeds +50%. A rough standard of adjustable DC drift is 50%, and therefore, the configuration of FIG. 1A is incapable of modulation.

With the optical modulator 10 of the embodiment whose characteristic is illustrated by the solid line A, the DC drift shifts in the negative direction, and becomes almost constant after several tens of minutes have passed. As long as the DC drift shifts in the negative direction, the operating point can be corrected to the optimum point by reducing the applied DC bias voltage. In the embodiment, the DC drift direction is kept in the negative direction because the voltage drop in the buffer layer 105 is maintained small and because the electric field is sufficiently applied to the optical waveguide 11.

FIG. 6A to FIG. 6G illustrate a manufacturing process of the optical modulator 10 according to an embodiment. The steps illustrated in FIG. 6A to FIG. 6G are only examples which can be employed during fabrication of the optical modulator 10, and the invention is not limited to the materials, parameters, conditions, or the like described below.

Figure 6A:
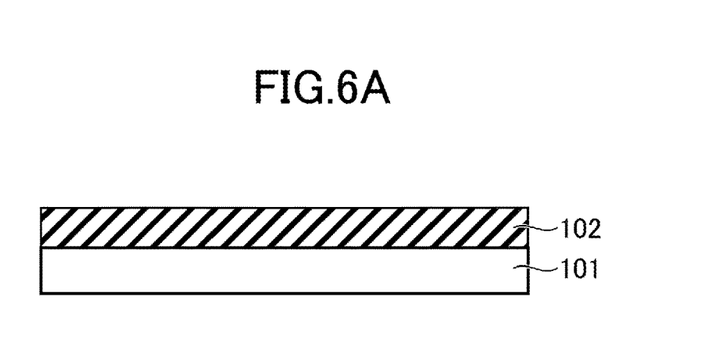
FIG. 6A illustrates a manufacturing process of an optical modulator according to an embodiment.

In FIG. 6A, an intermediate layer 102 is formed over the entire surface of the substrate 101 by a CVD method, a sputtering method, or the like. The intermediate layer 102 is made of a material having a resistivity higher than a buffer layer which is going to be formed in the subsequent process, and having a refractive index lower than an optical waveguide which is going to be formed in the subsequent process. The intermediate layer 102 may be a $SiO_2$ layer, a mixed crystal layer of $SiO_2$ and $TiO_2$, a mixed crystal layer of $SiO_2$ and $ZrO_2$, and so on. In forming the intermediate layer 102, the film forming conditions may be controlled so that the resistivity of the intermediate layer 102 is higher than the resistivity of the buffer layer to be formed in the subsequent step. Using a Si substrate with an oxide film, the substrate or the oxide film may be processed to a desired thickness, as necessary.

Figure 6B:
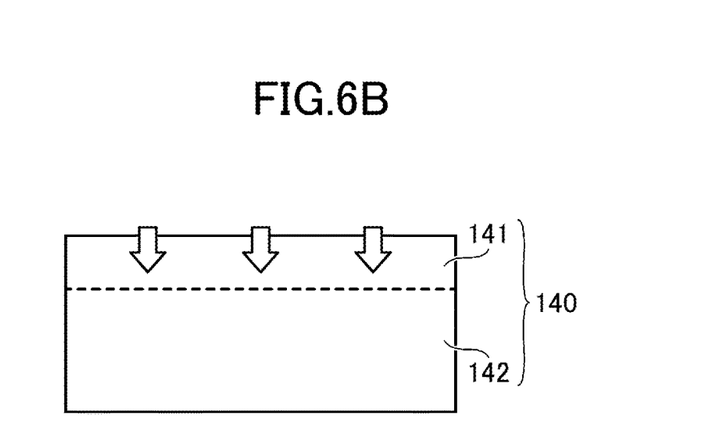
FIG. 6B illustrates a manufacturing process of an optical modulator according to an embodiment.

In FIG. 6B, a substrate 140 is prepared for forming a thin crystal film for an optical waveguide. In this example, the substrate 140 is an LN substrate. An ion-implanted layer 141 is formed by irradiating a main surface of the substrate 140 with an ion beam. By controlling the injection energy, ions can be implanted to a desired depth. For example, the thickness of the ion-implanted layer 141 may be 500 nm to several microns. The ions may be hydrogen ions, helium ions, argon ions, or the like. The rest of the substrate not having been subjected to the ion implantation is used as a support layer 142.

Figure 6C:
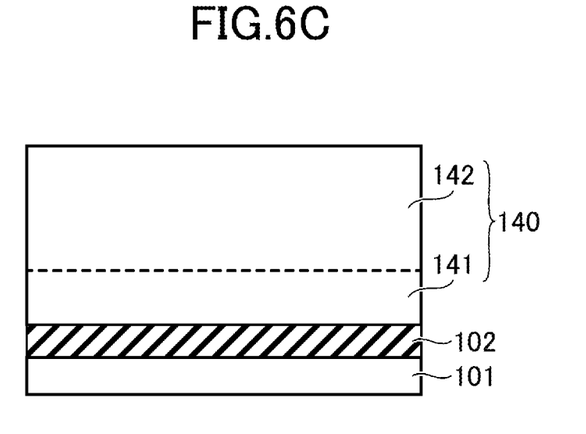
FIG. 6C illustrates a manufacturing process of an optical modulator according to an embodiment.

In FIG. 6C, the ion-implanted layer 141 of the substrate 140 is bonded to the intermediate layer 102. Prior to the bonding, the bonding surface(s) of at least one of the ion-implanted layer 141 and the intermediate layer 102 may be surface-activated with a wet chemical, ozone, plasma, or the like.

Figure 6D:
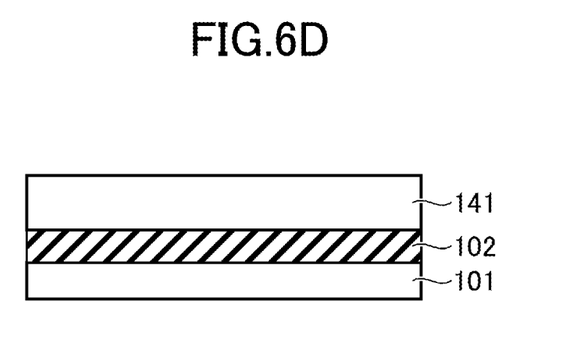
FIG. 6D illustrates a manufacturing process of an optical modulator according to an embodiment.

In FIG. 6D, a heat treatment such as annealing is performed on the bonded wafer to separate the support layer 142. By the heat treatment, microcavities are produced at the interface between the ion-implanted layer 141 and the support layer 142, whereby the support layer 142 can be removed from the ion-implanted layer 141. After the removal, the surface of the ion-implanted layer 141 may be planarized by chemical mechanical polishing (CMP).

Figure 6E:
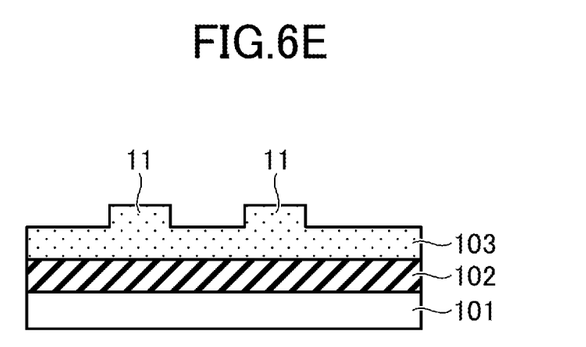
FIG. 6E illustrates a manufacturing process of an optical modulator according to an embodiment.

In FIG. 6E, the ion-implanted layer 141 is etched to fabricate a ridge-type optical waveguide 11 formed of the thin LN crystal film 103. The height of the ridge of the optical waveguide 11 is, for example, 200 nm to 300 nm, and the width is, for example, 300 nm to 500 nm.

Figure 6F:
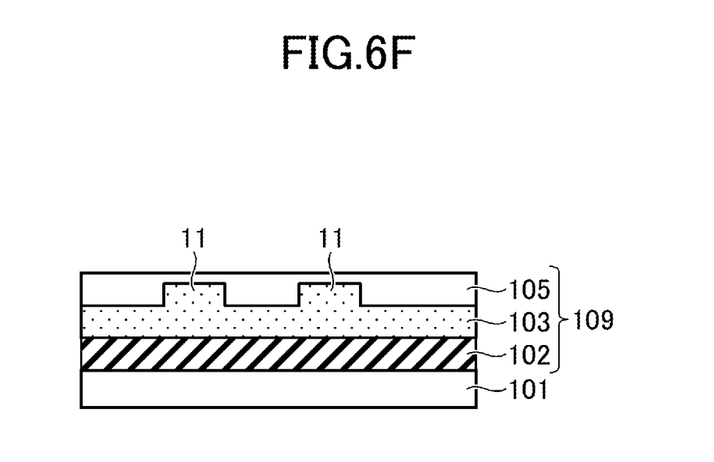
FIG. 6F illustrates a manufacturing process of an optical modulator according to an embodiment.

In FIG. 6F, a buffer layer 105 is formed on the entire surface by sputtering or the like. Thus, a multilayered structure with the intermediate layer 102, the optical waveguide 11 of the thin crystal film 103, and the buffer layer 105 stacked in this order is obtained. The buffer layer 105 is, for example, a $SiO_2$ film having a thickness of about 0.5 µm to 1 µm. During the formation of the buffer layer 105, impurity elements may be introduced so as to set the resistivity of the buffer layer 105 lower than the resistivity of the intermediate layer 102, more preferably, lower than the resistivities of the intermediate layer 102 and the optical waveguide 11.

Reducing the series resistance of the buffer layer 105 is effective for suppressing the electric field drop in the buffer layer 105. However, if the resistance of the buffer layer 105 is reduced too much, the modulation efficiency decreases due to increased current flow, which may also cause a short circuit between the electrodes. Therefore, there is a limit in lowering the resistance of the buffer layer 105. This issue can be solved by setting the resistivity of the intermediate layer 102 even higher than the resistivity of the optical waveguide 11.

The resistivity of the optical waveguide 11 formed of the thin crystal film 103 is determined by the composition of the crystal material, as has been described above. It may be difficult to impart a sufficient resistivity difference between the optical waveguide 11 and the buffer layer 105, depending on the material. In this case, it is preferable to set the resistivity of the intermediate layer 102 greater than the resistivity of the optical waveguide 11, or set the intermediate layer 102 thicker than the thin crystal film 103 and the optical waveguide 11, by controlling the film forming conditions of the intermediate layer 102. With this arrangement, the total resistance of the optical waveguide 11 and the intermediate layer 102, connected in series to the resistance of the buffer layer 105, can be increased.

In design, after the material of the thin crystal film 103 is selected, the resistivity of the buffer layer 105 is first set to a level lower than the resistivity of the optical waveguide 11, and a level that does not cause a short circuit or a fall of the modulation efficiency. Then, the resistivity of the intermediate layer 102 is set so as to be higher than the resistivity of the optical waveguide 11. In this design, the resistivity increases from the buffer layer 105, the optical waveguide 11, and the intermediate layer 102 in the ascending order. The resistivity of the intermediate layer 102 can be easily adjusted by controlling the film forming conditions. After the buffer layer 105 is formed, its surface may be planarized.

Figure 6G:
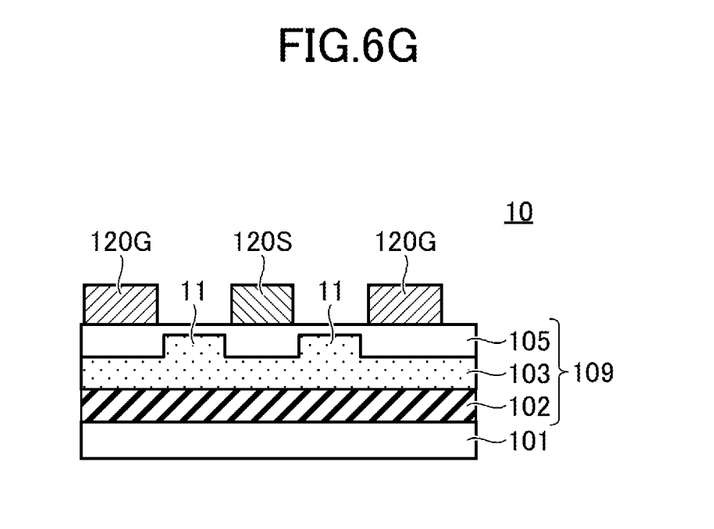
FIG. 6G illustrates a manufacturing process of an optical modulator according to an embodiment.

In FIG. 6G, a DC signal electrode 120S and a DC ground electrode 120G are formed on the buffer layer 105, and an optical modulator 10 is fabricated. In the optical modulator 10, the resistivity of the intermediate layer 102 is higher than the resistivity of the buffer layer 105, and the voltage drop in the buffer layer 105 is suppressed. The electric field is efficiently concentrated onto the optical waveguide 11, and DC drift shifting in the positive direction is suppressed. As a result, an optical device with long term reliability is achieved.

<Application to Optical Transceiver>

Figure 7:
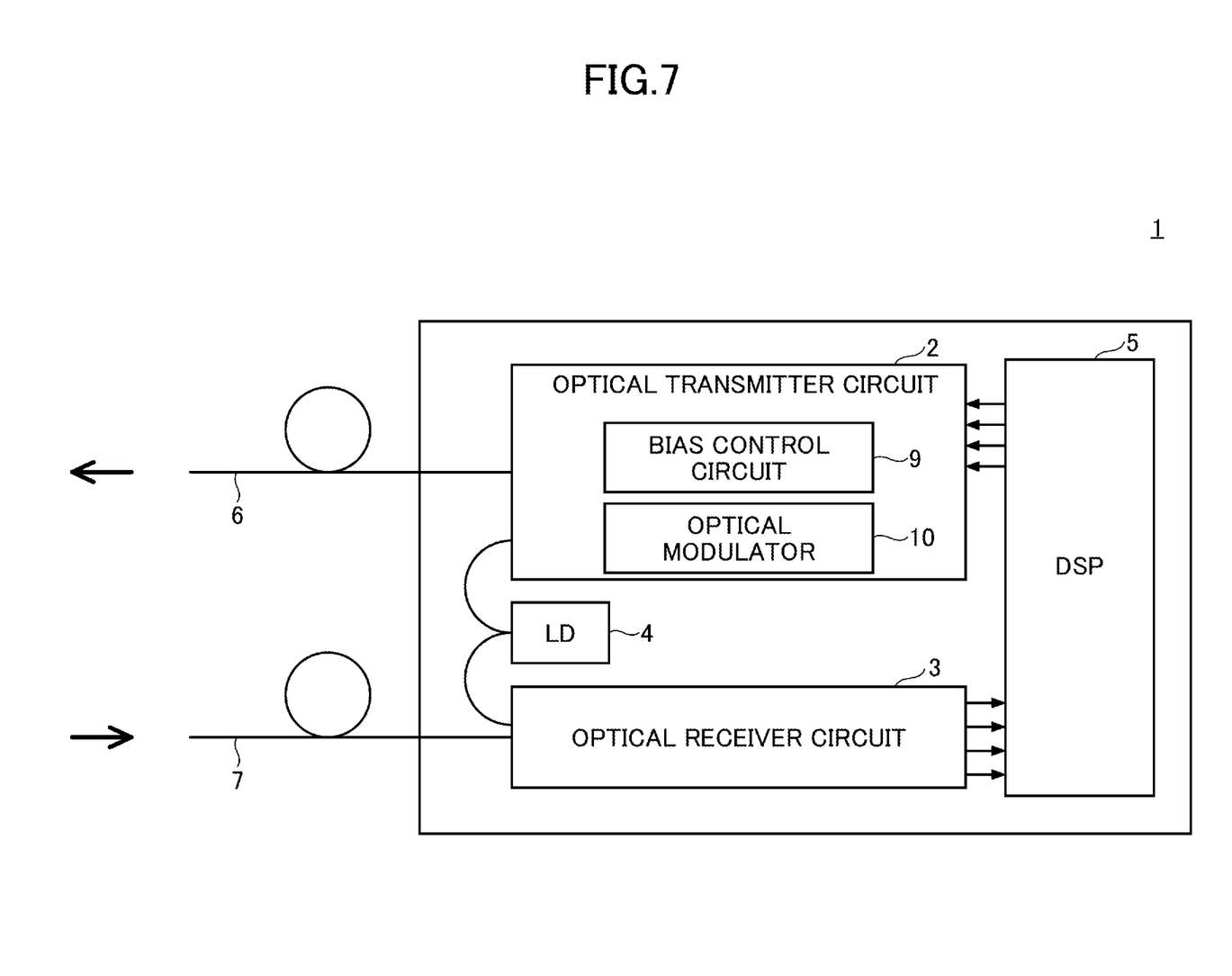
FIG. 7 is a schematic diagram of an optical transceiver to which the optical modulator of the embodiment is applied.

FIG. 7 is a schematic diagram of an optical transceiver 1 to which the optical modulator 10 is applied. In this example, the optical transceiver 1 includes an optical transmitter circuit 2, an optical receiver circuit 3, a digital signal processor (DSP) 5, and a laser diode (LD) 4.

The optical transmitter circuit 2 has an optical modulator 10 according to the embodiment, and a bias control circuit 9. The bias control circuit 9 controls the DC bias applied to the optical modulator 10. The bias control circuit 9 may be configured by combining a monitor circuit with a logic device such as a field programmable gate array (FPGA), or with a software program. In the optical modulator 10, positive-direction DC drift shifting is suppressed, and long-term reliability is assured even during the DC bias control operations.

The optical transmitter circuit 2 may include a driver circuit that inputs a high-speed drive signal to the RF electrode 110 of the optical modulator 10. The DSP 5 outputs a digital data signal. The digital data signal is converted into a high-speed analog signal and then supplied to the RF electrode 110 of the optical modulator 10. A light beam output from the LD 4 is modulated by the RF signal at the optical modulator 10. The modulated optical signal is output to an optical transmission line 6 such as a fiber optic cable.

The optical receiver circuit 3 converts an optical signal received from an optical transmission line 7, such as a fiber optic cable, into an electric signal. The optical receiver circuit 3 is, for example, a coherent receiver circuit which detects orthogonal polarized components and signal components of in phase (I phase) and quadrature phase (Q phase) of each of the polarized components, using the light beam output from the LD 4 as a reference light (or a local oscillation light). The detected light components are converted into electric signals, which are then subjected to signal processing such as waveform shaping or equalization in the DSP 5 and decoded.

The above-described embodiment is illustrative, and various substitutions and alterations are conceivable. The substrate 101 may be made of a material having a refractive index lower than that of the thin crystal film 13 and the optical waveguide 11, and it may be used as a part of the cladding. The configuration of the embodiment is applicable not only to an optical modulator, but also to another optical device such as an optical switch or an optical filter, and to a photonic integrated circuit in which these optical devices are integrated together with a wavelength tunable laser. The optical modulator 10 is not limited to a dual-polarization modulation scheme, and is applicable to any modulation scheme requiring control on the operating point by applying a DC bias, including 16-level quadrature amplitude modulation (16QAM) and quadrature phase Shift Keying (QPSK). In either case, DC drift shifting in the positive direction is suppressed, and a compact optical modulator with long-term reliability can be achieved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the scope of the invention.

What is claimed is:

1. An optical device comprising:
   a substrate;
   a layered structure provided on the substrate, the layered structure including an intermediate layer, an optical waveguide formed of a thin crystal film having an electro-optic effect, and a buffer layer stacked in this order; and
   an electrode provided on or above the buffer layer and configured to apply a direct current voltage to the optical waveguide,
   wherein a resistivity of the intermediate layer is higher than a resistivity of the buffer layer, and the resistivity of the buffer layer is lower than a resistivity of the optical waveguide formed of the thin crystal film.

2. The optical device as claimed in claim 1,
   wherein a thickness of the intermediate layer is greater than a thickness of the optical waveguide formed of the thin crystal film.

3. The optical device as claimed in claim 1,
   wherein refractive indexes of the intermediate layer and the buffer layer are lower than a refractive index of the optical waveguide formed of the thin crystal film.

4. The optical device as claimed in claim 1,
   wherein a refractive index of the substrate is lower than a refractive index of the optical waveguide formed of the thin crystal film.

5. An optical device comprising:
   a substrate;
   a layered structure provided on the substrate, the layered structure including an intermediate layer, an optical waveguide formed of a thin crystal film having an electro-optic effect, and a buffer layer stacked in this order; and
   an electrode provided on or above the buffer layer and configured to apply a direct current voltage to the optical waveguide,
   wherein a resistivity of the intermediate layer is higher than a resistivity of the buffer layer, and the resistivity of the intermediate layer is higher than a resistivity of the optical waveguide formed of the thin crystal film.

6. The optical device as claimed in claim 5,
   wherein a thickness of the intermediate layer is greater than a thickness of the optical waveguide formed of the thin crystal film.

7. The optical device as claimed in claim 5,
   wherein refractive indexes of the intermediate layer and the buffer layer are lower than a refractive index of the optical waveguide formed of the thin crystal film.

8. The optical device as claimed in claim 5,
   wherein a refractive index of the substrate is lower than a refractive index of the optical waveguide formed of the thin crystal film.

9. An optical device comprising:
   a substrate;
   a layered structure provided on the substrate, the layered structure including an intermediate layer, an optical waveguide formed of a thin crystal film having an electro-optic effect, and a buffer layer stacked in this order; and
   an electrode provided on or above the buffer layer and configured to apply a direct current voltage to the optical waveguide,
   wherein a resistivity of the intermediate layer is higher than a resistivity of the buffer layer, and a resistivity of the substrate is higher than the resistivity of the buffer layer.

10. The optical device as claimed in claim 9,
    wherein a thickness of the intermediate layer is greater than a thickness of the optical waveguide formed of the thin crystal film.

11. The optical device as claimed in claim 9,
wherein refractive indexes of the intermediate layer and the buffer layer are lower than a refractive index of the optical waveguide formed of the thin crystal film.

12. The optical device as claimed in claim 9,
wherein a refractive index of the substrate is lower than a refractive index of the optical waveguide formed of the thin crystal film.

13. An optical transceiver comprising:
an optical transmitter circuit; and
an optical receiver circuit,
wherein the optical transmitter circuit has an optical device comprising a substrate, a layered structure provided on the substrate and including an intermediate layer, an optical waveguide formed of a thin crystal film having an electro-optic effect, and a buffer layer stacked in this order, and an electrode provided on or above the buffer layer and configured to apply a direct current voltage to the optical waveguide, and
wherein a resistivity of the intermediate layer is higher than a resistivity of the buffer layer, and the resistivity of the buffer layer is lower than a resistivity of the optical waveguide formed of the thin crystal film.

14. An optical transceiver comprising:
an optical transmitter circuit; and
an optical receiver circuit,
wherein the optical transmitter circuit has an optical device comprising a substrate, a layered structure provided on the substrate and including an intermediate layer, an optical waveguide formed of a thin crystal film having an electro-optic effect, and a buffer layer stacked in this order, and an electrode provided on or above the buffer layer and configured to apply a direct current voltage to the optical waveguide, and
wherein a resistivity of the intermediate layer is higher than a resistivity of the buffer layer, and the resistivity of the intermediate layer is higher than a resistivity of the optical waveguide formed of the thin crystal film.

15. An optical transceiver comprising:
an optical transmitter circuit; and
an optical receiver circuit,
wherein the optical transmitter circuit has an optical device comprising a substrate, a layered structure provided on the substrate and including an intermediate layer, an optical waveguide formed of a thin crystal film having an electro-optic effect, and a buffer layer stacked in this order, and an electrode provided on or above the buffer layer and configured to apply a direct current voltage to the optical waveguide, and
wherein a resistivity of the intermediate layer is higher than a resistivity of the buffer layer, and a resistivity of the substrate is higher than the resistivity of the buffer layer.

* * * * *